United States Patent
Jwa (10) Patent No.: US 12,355,865 B2
(45) Date of Patent: Jul. 8, 2025

(54) HYBRID CLOUD-BASED SECURITY SERVICE METHOD AND APPARATUS FOR SECURITY OF CONFIDENTIAL DATA

(71) Applicant: SPARROW CO., LTD, Seoul (KR)

(72) Inventor: Tae Bin Jwa, Seoul (KR)

(73) Assignee: SPARROW CO., LTD, Seoul (KR)

( * ) Notice: Subject to any disclaimer, the term of this patent is extended or adjusted under 35 U.S.C. 154(b) by 363 days.

(21) Appl. No.: 18/061,107

(22) Filed: Dec. 2, 2022

(65) Prior Publication Data
US 2023/0179404 A1    Jun. 8, 2023

(30) Foreign Application Priority Data

Dec. 3, 2021    (KR) .................. 10-2021-0172209

(51) Int. Cl.
*H04L 9/08*    (2006.01)
(52) U.S. Cl.
CPC .......... *H04L 9/0825* (2013.01); *H04L 9/0866* (2013.01); *H04L 9/0894* (2013.01)
(58) Field of Classification Search
None
See application file for complete search history.

(56) References Cited

U.S. PATENT DOCUMENTS

| | | | |
|---|---|---|---|
| 2013/0311781 A1 | 11/2013 | Wang et al. | |
| 2016/0253515 A1* | 9/2016 | Damgård | H04L 63/062 713/165 |
| 2018/0157842 A1* | 6/2018 | Holz | G06F 16/338 |
| 2020/0195425 A1* | 6/2020 | Mistry | H04L 63/123 |
| 2020/0327248 A1* | 10/2020 | Mechler | H04L 9/321 |
| 2022/0263655 A1* | 8/2022 | Murray | H04L 63/0823 |
| 2023/0132017 A1* | 4/2023 | McElveen | G06F 16/1744 707/693 |
| 2023/0412574 A1* | 12/2023 | Torfs | H04L 9/3073 |

FOREIGN PATENT DOCUMENTS

| | | |
|---|---|---|
| KR | 10-2013-0140948 A | 12/2013 |
| KR | 10-2018-0118874 A | 11/2018 |

OTHER PUBLICATIONS

Office Action for KR 10-2021-0172209 by Korean Intellectual Property Office dated Apr. 6, 2023.

* cited by examiner

*Primary Examiner* — Fatoumata Traore
(74) *Attorney, Agent, or Firm* — BROADVIEW IP LAW, PC (57) ABSTRACT

A hybrid cloud-based security service apparatus for securing confidential data includes a cloud service module assigning an analysis identifier to data input by a user of a network connected to a cloud and receiving a request for delivery of encrypted data from the user, a key generation service unit located in an on-premise connected to the cloud and generating an encryption key based on the analysis ID, an encryption processing unit encrypting the data using the encryption key and a predetermined encryption algorithm, a logical operation unit performing a logical operation on the encryption key used to encrypt the data to invert predetermined bits of the encryption key, and a decryption service module receiving the encrypted data and the encryption key from the on-premise, restoring the encryption key by performing a logical operation, and decrypting the encrypted data using the restored encryption key and a decryption algorithm.

12 Claims, 6 Drawing Sheets

HYBRID CLOUD-BASED SECURITY SERVICE METHOD AND APPARATUS FOR SECURITY OF CONFIDENTIAL DATA

CROSS REFERENCE TO RELATED APPLICATION

The present application claims priority to Korean Patent Application No. 10-2021-0172209, filed on Dec. 3, 2021, the entire contents of which is incorporated herein for all purposes by this reference.

BACKGROUND

1. Technical Field

The present invention relates to a cloud security service technology, and more particularly, to a hybrid cloud-based security service method and apparatus for securing confidential data.

2. Related Art

Cloud-based security technology is represented by the so-called Security as a Service (SECaaS). SECaaS refers to providing security services required by customers using a cloud.

Figure 1:
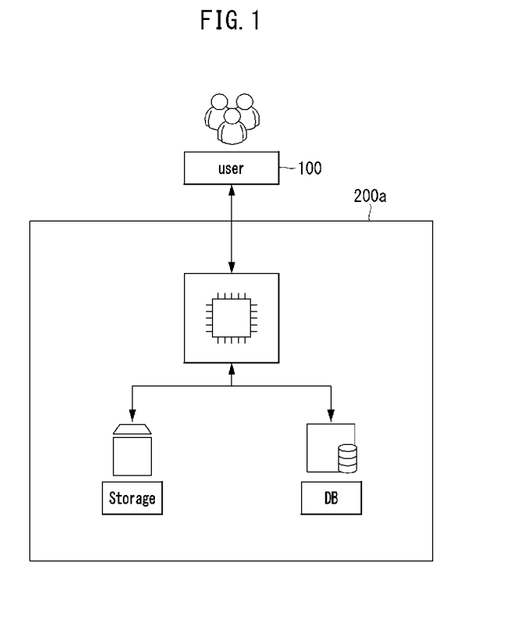
FIG. 1 is a schematic diagram illustrating a conventional cloud system for software as a service.

FIG. 1 is a schematic diagram illustrating a cloud system for existing software as a service (Saas). Some existing SaaS provides a user 100 with static and dynamic analysis services for source code security and application security based on the Amazon Web Service (AWS) cloud 200a.

Static analysis selects various domestic and international inspection criteria corresponding to major programming languages such as JAVA, Java Server Pages (JSP), JavaScript, Personal Home Page (PHP), C#, Active Server Pages Network Enable Technologies (ASP.NET), Objective C, Python, Hypertext Markup Language (HTML), Structured Query Language (SQL), Extensible Markup Language (XML), etc. to inspect security vulnerabilities and quality of source code.

The dynamic analysis automatically collects all sub-paths included in the Uniform Resource Locator (URL) of a web application through various analyses from basic HTTP message analysis to Ajax analysis and event reproduction executable in a browser and detects security vulnerabilities in the collected path.

In general, users use the service by accessing a Representational state transfer application programming interface (REST API)-based servers located in the private subnet (closed network) through the web application (front end) located in the public subnet (open network). In the private subnet (closed network), servers for each service, database (DB), and S3 bucket (storage for source code storage) exist.

In the case of dynamic analysis, the URL of the target application is set at the time of project creation, and the analysis is performed on the URL. At this time, the project key file must be uploaded to the target application, and the ownership of the target application is verified through project key file upload confirmation. When the analysis starts, all sub-paths in the URL are collected, security vulnerabilities in the collected paths are detected, and the results are uploaded to the DB in real time.

In the case of static analysis, the target source code file is uploaded to check source code security vulnerabilities. The target source code file is uploaded to the S3 bucket in the private subnet and configured to be accessible only within the virtual private cloud (VPC). Security vulnerability detection is performed on the source code uploaded to the S3 bucket, and the results are uploaded to the DB in real time.

Since the current SECaaS is configured for the public cloud, all information is stored and managed in the cloud, and the information stored in the cloud includes security-sensitive information such as source code files and security vulnerability results. In fact, many customers avoid uploading the source code to the cloud, and there are cases where they have against the use of SECaaS. To solve these problems, a cloud can be configured in the form of a platform as a service (PaaS), but in this case, the customer has to manage the server themself.

SUMMARY

The present invention has been derived to solve the problems of conventional technology, and it is an object of the present invention to provide a hybrid cloud-based security service apparatus and method for ensuring the security of confidential data that is capable of configuring a cloud-based security service improving the security of confidential data as well as the benefits of SaaS-type services.

In order to achieve the above object, the hybrid cloud-based security service apparatus for securing confidential data according to an embodiment of the present invention includes a cloud service module assigning an analysis identifier (ID) to data input by a user of a network connected to a cloud and receiving a request for delivery of encrypted data from the user; a key generation service unit located in an on-premise connected to the cloud and generating an encryption key based on the analysis ID; an encryption processing unit encrypting the data using the encryption key and a predetermined encryption algorithm; a logical operation unit performing a logical operation on the encryption key used to encrypt the data to invert predetermined bits of the encryption key; and a decryption service module receiving the encrypted data and the encryption key from the on-premise, restoring the encryption key by performing a logical operation, and decrypting the encrypted data using the restored encryption key and a decryption algorithm.

The decryption service module may be installed in the cloud.

The data may be information requiring security and comprise source code or security vulnerability detection results.

The data may be exchanged in an encrypted state between the cloud and the on-premise.

The encryption algorithm or the decryption algorithm may be a symmetric key encryption algorithm using advanced encryption standard (AES).

In order to achieve the above object, the hybrid cloud-based security service method for securing confidential data according to another embodiment of the present invention includes assigning a unique identifier (ID) to input data; generating an encryption key based on the unique ID; encrypting the data using an encryption algorithm; storing the encryption key logically operated after being used for encrypting the data and the data encrypted using the encryption algorithm in a storage or database (DB) of the on-premise; receiving a request for delivery of the encrypted data from a user of a network connected to the cloud; receiving the encrypted data and the logically operated encryption key together from the on-premise; restoring the encryption by performing a logical operation on the logically operated encryption key; and decrypting the encrypted data using the restored encryption key and a decryption algorithm.

The data may comprise source code or security vulnerability detection result as information requiring security.

The data may be exchanged in an encrypted state between the cloud and the on-premise.

The encryption algorithm and the decryption algorithm may be symmetric key encryption algorithms using advanced encryption standard (AES).

The logical operation may comprise an exclusive or (XOR) operation.

In order to achieve the above object, a security service method based on a hybrid cloud including a cloud and an on-premise according to another embodiment of the present invention includes receiving data upload by a user through a network; assigning an analysis identifier (ID) to the received data; transmitting the analysis ID to the on-premise, wherein the on-premise generates an encryption key based on the analysis ID, encrypts data using the encryption key and an encryption algorithm, performs a logical operation on the encryption key used to encrypt the data to invert at least one predetermined bit of the encryption key, stores the logically operated encryption key in a database along with the analysis ID and encrypted data storage location information, and stores encrypted data in a storage; receiving a request for delivery of the encrypted data from the user; transmitting the analysis ID generated in response to the request for delivery of the encrypted data, the on-premise retrieving the encryption key and the encrypted data storage location information from the database based on the analysis ID and retrieving the encrypted data from the storage based on the storage location information; receiving the encrypted data and encryption key from the on-premise; and restoring the encryption key by performing the logical operation and decrypting the encrypted data using the restored encryption key and a decryption algorithm.

The method may further comprise providing the user with the decrypted data through a cloud service.

In order to achieve the above object, the hybrid cloud-based security service method for securing confidential data according to another embodiment of the present invention is a security service method performed in an on-premise of a hybrid cloud including a cloud and on-premise and includes receiving an analysis ID and data from a cloud, the cloud receiving the data uploaded by a user and generate the analysis ID to the received data; generating an encryption key based on the analysis ID; encrypting the data using the encryption key and a predetermined encryption algorithm; inverting at least one predetermined bit of the encryption key by performing a logical operation on the encryption key; storing the encryption key with inverted bits in a database along with the analysis ID and encrypted data storage location information; and storing the encrypted data in storage.

The hybrid cloud-based security service method may further include receiving the analysis ID for the encrypted data from the cloud; retrieving the encrypted data storage location information and the encryption key with some inverted bits from the database based on the analysis ID; retrieving the encrypted data from storage based on storage location information; and transmitting the encryption key with some inverted bits and the encrypted data to the decryption service module in the cloud.

Here, the decryption service module may restore an encryption key with some inverted bits through a logical operation and decrypt the encrypted data using the restored encryption key and a predetermined decryption algorithm. And the restored data may be delivered to the user through a cloud service.

BRIEF DESCRIPTION OF DRAWINGS

Example embodiments of the present invention will become more apparent by describing in detail example embodiments of the present invention with reference to the accompanying drawings, in which.

DETAILED DESCRIPTION OF EXAMPLE EMBODIMENTS

For a more clear understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

A communication system or memory system to which example embodiments of the present invention are applied will be described. The communication system or memory system to which example embodiments of the present invention are applied is not limited to the following description. Example embodiments of the present invention may be applied to various communication systems. Here, the term "communication system" may be used interchangeably with "communication network."

Hereinafter, exemplary embodiments of the present invention will be described in detail with reference to the accompanying drawings.

Figure 2:
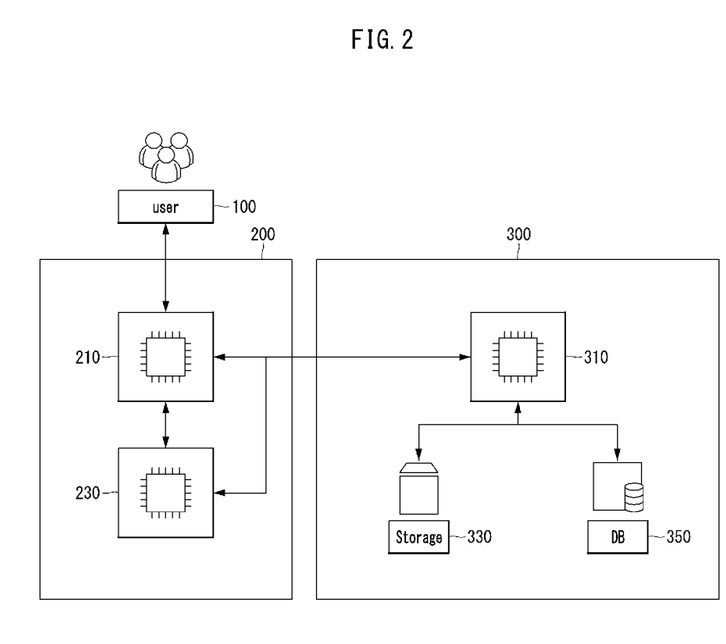
FIG. 2 is a diagram illustrating a configuration of a hybrid cloud-based security service device for security of confidential data according to an embodiment of the present invention.

FIG. 2 is a diagram illustrating a configuration of a hybrid cloud-based security service device for security of confidential data according to an embodiment of the present invention.

Referring to FIG. 2, a hybrid cloud-based security service apparatus 1000 for security of confidential data according to an embodiment of the present invention has a hybrid cloud form in which a public cloud 200 and an on-premise 300 are combined.

The cloud 200 may include a cloud service module 210 for all services of the cloud. The cloud service module 210 may be implemented with at least one first processor. The cloud 200 may also include a decryption service module 230 for decryption service. The decryption service module 230 may be implemented with at least one third processor. The cloud service module 210 and the decryption service module 230 may be integrated and implemented as a single processor. Also, the on-premise 300 may include an encryption service module 310 for encryption services. The encryption service module 310 may be implemented with at least one second processor. Assuming that the cloud 200 and the on-premise 300 can operate as independent software and/or hardware, the encryption service module 310, the cloud service module 210, and the decryption service module 230 may be integrated into a single processor.

The on-premise 300 may include a storage 330 and a database (DB) 350 for storing and managing source codes or data. The storage 330 may store encrypted data, and the database 350 may store an analysis ID, an encryption key encrypted by logical operation, and storage location information of the encrypted data.

In the existing SECaaS storing all information in the cloud, security-sensitive information is also stored in an external cloud rather than an in-house computer and thus likely to be exposed to the risk of leakage depending on the security state of the cloud. In order to solve this drawback, in this embodiment, a service for storing security-sensitive information such as source code and security vulnerability detection results of the customer company is built in the on-premise 300 that is configured to communicate with the public cloud 200.

All data being exchanged during communication between the cloud 200 and the on-premise 300 is transmitted in an encrypted manner, and the cloud 200 decrypts the encrypted data via a decryption algorithm and delivers the decrypted data to the user 100 via a hybrid cloud-based security service, and then the data is destroyed without being stored in the cloud 200.

Typically, encryption algorithms are classified into symmetric key encryption algorithms and asymmetric key encryption algorithms according to encryption techniques. Symmetric key encryption is fast but has a drawback of being vulnerable to security because using a single secret key requires key exchange. Asymmetric key encryption does not require key exchange because the keys for encryption and decryption are different, but the data processing speed is slow (approximately 10000 times compared to the case of using a symmetric key).

In the hybrid cloud-based security service of this embodiment, symmetric key encryption is selected and used by emphasizing the importance of processing speed from the point of view of providing services, in consideration of the recent encryption trend dealing with large files. In particular, the Advanced Encryption Standard is used. In addition, in order to compensate for the disadvantages of the symmetric key encryption algorithm, i.e., security vulnerability, a logical operation, e.g., an exclusive or (XOR) operation is performed on the secret key being exchanged.

Figure 3:
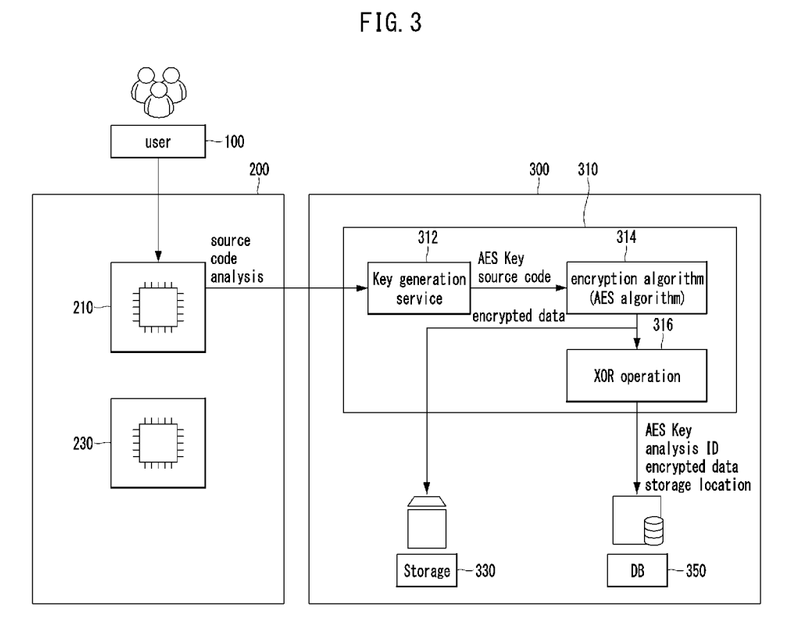
FIG. 3 is a block diagram illustrating an encryption service of a hybrid cloud-based security service apparatus for securing confidential data according to an embodiment of the present invention.

FIG. 3 is a block diagram illustrating an encryption service of a hybrid cloud-based security service apparatus for securing confidential data according to an embodiment of the present invention.

Referring to FIG. 3, the on-premise 300 of the hybrid cloud-based security service apparatus according to this embodiment may include an encryption service module 310. The encryption service module 310 may correspond to at least one second processor. Also, the encryption service module 310 may include a key generation service unit 312, an encryption algorithm processing unit 314, and a logical operation unit 316. The encryption algorithm may include an AES algorithm, and the logical operation may include an XOR operation. The logical operation unit 316 may be referred to as a first logical operation unit.

The encryption service process of the hybrid cloud-based security service apparatus (hereinafter simply referred to as a 'security service device') may be initiated by the user 100 uploading data. Data may include source code.

Next, the cloud service module 210 of the public cloud 200 of the security service apparatus may assign a unique identifier (ID) to data input by the user 100. The unique ID may be referred to as an analysis ID.

Next, the encryption service module 310 of the on-premise 300 of the security service apparatus may generate an encryption key, for example, an AES key, based on the unique ID via the key generation service unit 312.

Next, when the AES key and data (e.g., source code) are transferred from the key generation service unit 312 to the encryption algorithm processing unit 314, the encryption algorithm processing unit 314 may encrypt the data using the encryption algorithm (e.g., the AES algorithm).

Next, data encrypted in the encryption algorithm processing unit 314 may be stored in the storage 330 of the on-premise 300. Also, storage location information of the encrypted data, analysis ID information, and an encryption key calculated and processed by the logical operation unit 316, for example, an AES key, may be stored in the database 350.

Figure 4:
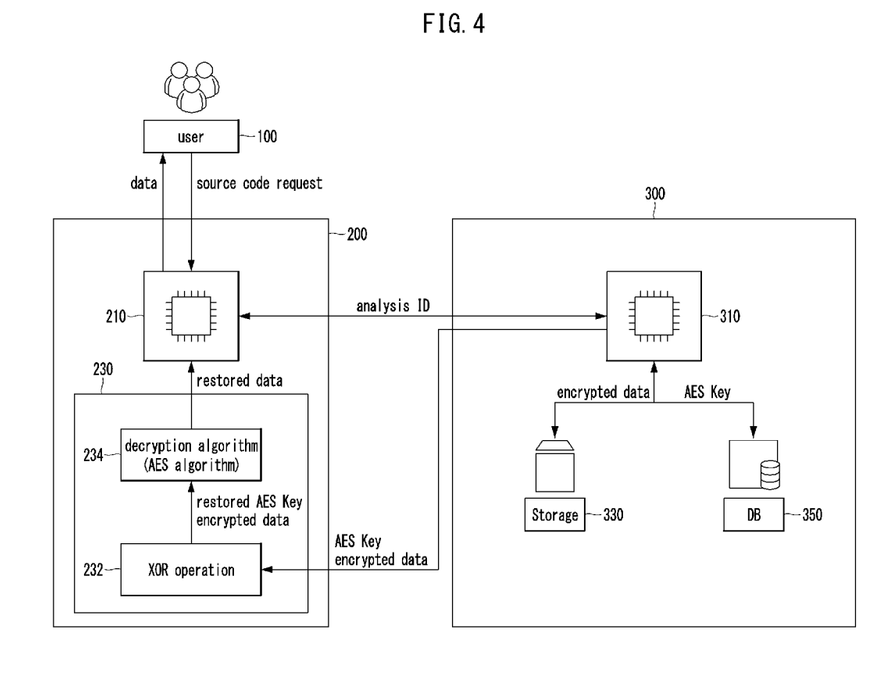
FIG. 4 is a block diagram illustrating a decryption service procedure of a hybrid cloud-based security service apparatus for securing confidential data according to an embodiment of the present invention.

FIG. 4 is a block diagram illustrating a decryption service procedure of a hybrid cloud-based security service apparatus for securing confidential data according to an embodiment of the present invention.

Referring to FIG. 4, the public cloud 200 of the hybrid cloud-based security service apparatus according to the present embodiment may include a cloud service module 210 and a decryption service module 230.

The decryption service module 230 may include a logical operation unit 232 and a decryption algorithm processing unit 234. The logical operation unit 232 includes a unit that performs an XOR operation and may be referred to as a second logical operation unit.

The decryption service procedure of the security service apparatus may start when a request for specific data is received from a user accessing a cloud service through a network. The specific data may be source code or encrypted data stored in the storage of the on-premise 300.

According to the user's request, the cloud service module 210 of the cloud 200 of the security service apparatus transmits the analysis ID corresponding to the user's request to the on-premise 300 to request the encrypted data and AES key corresponding to the user's request. The analysis ID may be passed from the cloud 200 to the on-premise 300 in an encrypted state.

The encryption service module 310 of the on-premise 300 may retrieve the storage location of the encrypted data corresponding to the analysis ID and the AES key from the database 350 based on the analysis ID from the cloud 200 and read the encrypted data from the storage 330 based on the retrieved storage location.

Then, the encryption service module 310 may transfer the encrypted data and the AES key to the decryption service module 230 of the cloud 200.

Next, the logical operation unit 232 of the decryption service module 230 may perform an XOR operation on the AES key to restore the encryption key, and transfer the restored encryption key and encrypted data to the decryption algorithm processing unit 234.

Next, the decryption algorithm processing unit 234 may decrypt the encrypted data using the restored AES key and the AES algorithm.

The restored data may be delivered to the user 100 through the cloud service of the cloud service module 210.

Figure 5:
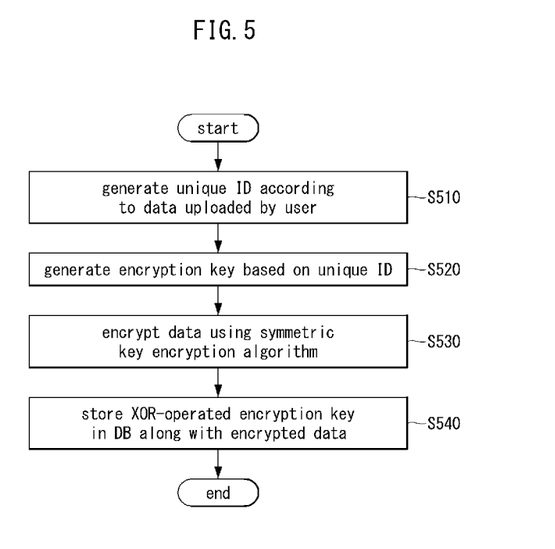
FIG. 5 is a flowchart illustrating the encryption operation steps of a hybrid cloud-based security service method for securing confidential data according to another embodiment of the present invention.

FIG. 5 is a flowchart illustrating the encryption operation steps of a hybrid cloud-based security service method for securing confidential data according to another embodiment of the present invention.

Referring to FIG. 5, the hybrid cloud-based security service method of this embodiment may include steps S510 to S540 for an encryption service procedure.

In detail, a unique ID may be generated at step S510 according to data uploaded by the user. That is, the cloud service module of the public cloud of the security service apparatus may assign a unique ID to data (e.g., source code) input or uploaded by a user through a network. The unique ID corresponds to the analysis ID. The cloud service module may transmit the unique ID to an on-premise encryption service module.

Next, the key generation service unit of the encryption service module may generate, at step S520, an encryption key based on the unique ID received from the cloud service module. The encryption key may be an AES key. The key generation service unit may transmit the encryption key and data to the encryption algorithm processing unit of the encryption service module.

Next, the encryption algorithm processing unit may encrypt, at step S530, data using a symmetric key encryption algorithm, particularly the AES algorithm. The encryption algorithm processing unit may store encrypted data in a storage.

The encryption algorithm processing unit may also transmit the encryption key to a logical operation unit. The logical operation unit may encrypt the encryption key through logical operation. The logical operation may be an XOR operation.

The encryption algorithm processing unit may also store the analysis ID and the encryption data storage location in the database together with the logically operated encryption key (S540).

Figure 6:
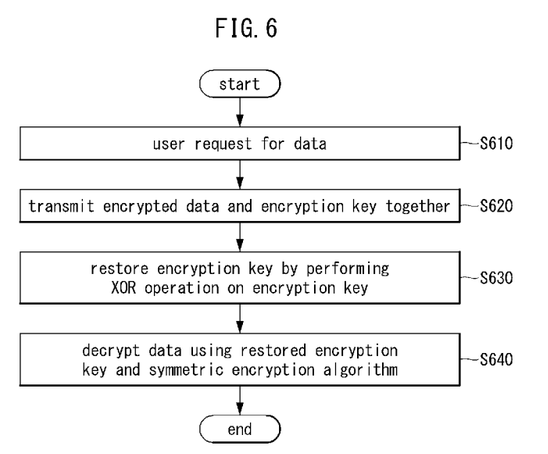
FIG. 6 is a flowchart illustrating decryption service steps of a hybrid cloud-based security service method for securing confidential data according to another embodiment of the present invention.

FIG. 6 is a flowchart illustrating decryption service steps of a hybrid cloud-based security service method for securing confidential data according to another embodiment of the present invention.

Referring to FIG. 6, the hybrid cloud-based security service method may include steps S610 to S640 for an decryption service procedure.

In detail, the decryption service procedure may start upon receipt of a request for delivery of data from a user at step S610. That is, when the user requests specific data such as a source code, the security service device may receive a corresponding request signal or request message.

In this case, the cloud service module of the cloud of the security service apparatus may generate an analysis ID for the user's request and transmit the analysis ID to the on-premise encryption service module of the security service apparatus.

The encryption service module may retrieve the encryption data storage location and encryption key from the database based on the analysis ID from the cloud service module, retrieve the encrypted data from the storage based on the storage location of the encryption data, and then transmit, at step S620, the encrypted data and the encryption key encrypted by logical operation together to the decryption service module of the cloud.

Next, the logical operation unit of the decryption service module may restore, at step S630, the encrypted encryption key by performing logical operation again thereon. The logical operation may include an XOR operation.

Next, the decryption algorithm processing unit of the decryption service module may decrypt, at step S640, the encrypted data received from the encryption service module with the decryption algorithm using the restored encryption key received from the logical operation unit.

According to the security service apparatus and method of the above-described embodiments, an on-premise for storing security-sensitive information such as source code and security vulnerability detection results of a customer company may be built and configured to communicate with a public cloud.

The security service apparatus and method may also be configured such that all data being exchanged during the communication between the cloud and the on-premise is transmitted in an encrypted state, and the data decrypted by the cloud and then delivered to the user through the cloud service is destroyed so as not to be stored in the cloud.

In addition, considering the importance of processing speed from the point of view of providing encryption services dealing with large files, it is possible to select and use a symmetric key encryption algorithm, particularly, Advanced Encryption Standard. In this case, it is possible to solve the disadvantage of key exchange for symmetric key encryption, i.e., the security vulnerability problem of symmetric key encryption, by performing logical operations such as XOR operation, on the secret key, i.e., the encryption key, before exchanging and managing the secret key.

The hybrid cloud configuration in the form of a combination of public cloud and on-premise may also make it possible to reduce the server management burden of users in using the existing public cloud and simultaneously improve security by storing confidential data in on-premise storage.

Meanwhile, the hybrid cloud-based security service method for security of confidential data of the above-described embodiment may be implemented as a security service method performed in a cloud of a hybrid cloud including the cloud and on-premise. That is, the security service method includes receiving data uploaded by a user; assigning analysis identifier (ID) to the received data; transmitting the analysis ID to an on-premise, the on-premise generating an encryption key based on the analysis ID, encrypting data using the encryption key and an encryption algorithm, performing a logical operation on the encryption key used to encrypt the data to invert at least one predetermined bit of the encryption key, storing the logically operated encryption key in a database (DB) along with the analysis ID and encrypted data storage location information, and storing encrypted data in a storage; receiving a request for delivery of data from the user; receiving the encrypted data and encryption key from the on-premise; and restoring the encryption key by performing the logical operation and decrypting the encrypted data using the restored encryption key and a decryption algorithm.

Here, the security service method may further include providing decrypted data to a user through a cloud service.

In addition, the hybrid cloud-based security service method of the above-described embodiment may be implemented as a security service method performed in the on-premise of the hybrid cloud including the cloud and on-premise. That is, the security service method may include receiving an analysis ID and data from a cloud, the cloud receiving the data uploaded by a user and generating the analysis ID to the received data; generating an encryption key based on the analysis ID; encrypting the data using the encryption key and a predetermined encryption algorithm; inverting at least one predetermined bit of the encryption key by performing a logical operation on the encryption key; storing the encryption key with inverted bits in a database along with the analysis ID and encrypted data storage location information; and storing the encrypted data in a storage.

The security service method may further include receiving the analysis ID for the encrypted data from the cloud; retrieving the encrypted data storage location information and the encryption key with some inverted bits from the database based on the analysis ID; retrieving the encrypted data from storage based on storage location information; and transmitting the encryption key with some inverted bits and the encrypted data to the decryption service module in the cloud. Here, the decryption service module may restore an encryption key with some inverted bits through a logical operation and decrypt the encrypted data using the restored encryption key and a predetermined decryption algorithm. And the restored data may be delivered to the user through a cloud service.

Figure 7:
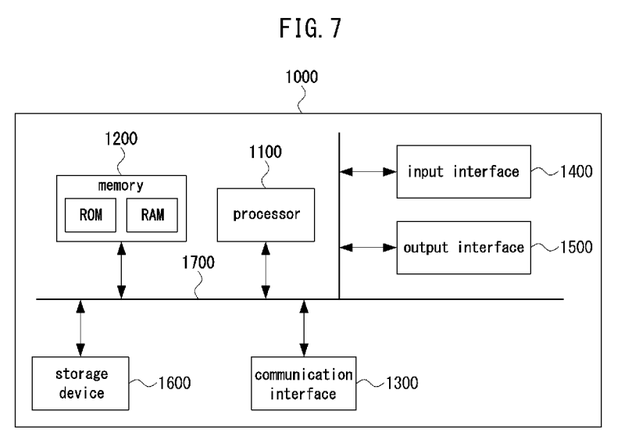
FIG. 7 is a diagram illustrating a hybrid cloud-based security service apparatus for securing confidential data according to another embodiment of the present invention.

FIG. 7 is a diagram illustrating a hybrid cloud-based security service apparatus for securing confidential data according to another embodiment of the present invention.

Referring to FIG. 7, the data management apparatus 1000 may also be configured to further include a memory 1200, a transceiver 1300, an input interface device 1400, an output interface device 1500, a storage device 1600, or a combination thereof. Each component included in the data management apparatus 1000 may be connected via a bus 1700 to communicate with each other.

In addition, the components included in the data management apparatus 1000 may be connected through individual interfaces or buses centered on the processor 1100 instead of the common bus 1700. For example, the processor 1100 may be connected to at least one of the memory 1200, the transceiver 1300, the input interface device 1400, the output interface device 1500, and the storage device 1600 through a dedicated interface.

The processor 1100 may execute program instructions stored in at least one of the memory 1200 and the storage device 1600. The processor 1100 may refer to a central processing unit (CPU), a graphics processing unit (GPU), or a dedicated processor on which the methods according to embodiments of the present disclosure are performed.

Each of the memory 1200 and the storage device 1600 may be configured with at least one of a volatile storage medium and a non-volatile storage medium. For example, the memory 1200 may be configured as at least one of read-only memory (ROM) and random access memory (RAM).

The transceiver 1300 may include a sub-communication system for performing communication with an external user terminal, a communication terminal, and the like. The sub-communication system may be configured to support a wired and/or wireless communication protocol.

The input interface device 1400 may include an input signal processing unit that maps, to a pre-stored instruction, or processes a signal input through at least one input means selected among input means such as a keyboard, a microphone, a touch pad, and a touch screen.

The output interface device 1500 may include an output signal processing unit mapping, to a prestored signal form or level, or processing a signal output under the control of the processor 1100 and at least one output means outputting a signal or information in the form of vibration or light according to a signal of the output signal processing unit. The at least one output means may include at least one selected among output means such as a speaker, a display device, a printer, an optical output device, and a vibration output device.

The above-described program instructions may include an instruction to receive data uploaded by a user, an instruction to assign analysis identifier (ID) to the received data, an instruction to deliver the analysis ID to on-premise, an instruction to receive data delivery request from the user, an instruction to receive encrypted data and an encryption key from on-premise, and an instruction to restore the encryption key through logic operation and decrypt the encrypted data using the restored encryption key and decryption algorithm.

The program instructions may also include an instruction to receive an analysis ID and data from the cloud, an instruction to generate an encryption key based on the analysis ID, an instruction to encrypt the data using an encryption key and a predetermined an instruction to invert at least one encryption algorithm, predetermined bit of the encryption key by performing a logical operation on the encryption key, an instruction to store the encryption key with some bits inverted in the database along with the analysis ID and encrypted data storage location information, and an instruction to store the encrypted data in storage.

The program instructions may also include an instruction to receive the analysis ID for the encrypted data from cloud, an instruction to retrieve storage location information of the encrypted data and an encryption key in which some bits are inverted from the database based on the analysis ID, an instruction to retrieve the encrypted data from storage based on storage location information, and an instruction to transmit the encryption key with some bits inverted and the encrypted data to the decryption service module in the cloud.

The hybrid cloud-based security service method and apparatus for ensuring security of confidential data according to the present invention is advantageous in terms of being able to meet customer's requirements for improved security by configuring a hybrid cloud in the form a combination of public cloud and on-premise to provide cloud services easily through the existing public cloud without the burden of user's server management while storing confidential data in on-premise storage.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A hybrid cloud-based security service apparatus for securing confidential data, the apparatus comprising:
a processor; and
a memory storing instructions that, when executed by the processor, cause the processor to:
assign an analysis identifier (ID) to data received from a user via a network connected to a cloud system;
receive, from the user, a request for delivery of encrypted data;
transmit the analysis ID to an on-premise system connected to the cloud system;
cause the on-premise system to:
generate an encryption key based on the analysis ID;
encrypt the data using the encryption key and a predetermined encryption algorithm;
apply a bitwise operation to the encryption key to invert at least one predetermined bit, thereby generating a modified encryption key; and
store the encrypted data and the modified encryption key in a storage or database associated with the on-premise system;
receive, from the on-premise system, the encrypted data and the modified encryption key;
restore the encryption key by reversing the bitwise operation previously applied to the encryption key; and
decrypt the encrypted data using the restored encryption key and a predetermined decryption algorithm.

2. The apparatus of claim 1, wherein the processor is included in the cloud system and is configured to perform the decryption of the encrypted data within the cloud system.

3. The apparatus of claim 1, wherein the data received from the user comprises security-sensitive information including source code or results of security vulnerability detection.

4. The apparatus of claim 1, wherein the transmission of the analysis ID, the encrypted data, and the modified encryption key between the cloud system and the on-premise system is performed via an encrypted communication channel.

5. The apparatus of claim 1, wherein the predetermined encryption algorithm and the decryption algorithm are symmetric key algorithms and include an advanced encryption standard (AES) algorithm.

6. A security service method based on a hybrid cloud comprising a cloud system and an on-premise system, the method comprising:
receiving, by the cloud system, data uploaded by a user through a network;
assigning, by the cloud system, an analysis identifier (ID) to the received data;
transmitting, by the cloud system, the analysis ID to the on-premise system;
generating, by the on-premise system, an encryption key based on the analysis ID;
encrypting, by the on-premise system, the received data using the encryption key and a predetermined encryption algorithm;
applying a bitwise operation to the encryption key to invert at least one predetermined bit, thereby generating a modified encryption key;

storing the encryption key and the modified encryption key in a storage or database (DB) associated with the on-premise system;

receiving, by the cloud system, a request from the user for delivery of the encrypted data;

retrieving, from the on-premise system, the encrypted data and the modified encryption key;

restoring, by the cloud system, the original encryption key by reversing the bitwise operation previously applied to the encryption key; and decrypting the encrypted data using the restored encryption key and a predetermined decryption algorithm.

7. The method of claim 6, wherein the data uploaded by the user comprises security-sensitive information including source code or results of security vulnerability detection.

8. The method of claim 6, wherein all communication between the cloud system and the on-premise system, including the transmission of the analysis identifier, the encrypted data, and the modified encryption key, is performed over an encrypted communication channel.

9. The method of claim 6, wherein the predetermined encryption algorithm and the predetermined decryption algorithm are symmetric key algorithms and include an advanced encryption standard (AES) algorithm.

10. The method of claim 9, wherein the bitwise operation comprises an exclusive OR (XOR) operation applied to at least one bit of the encryption key.

11. A security service method based on a hybrid cloud including a cloud system and an on-premise system, the method comprising:

receiving data upload by a user through a network;

assigning, by the cloud system, an analysis identifier (ID) to the received data;

transmitting the analysis ID to the on-premise system, the on-premise system generating an encryption key based on the analysis ID, encrypting the data using the encryption key and a predetermined encryption algorithm, performing a bitwise operation on the encryption key to invert at least one predetermined bit of the encryption key, storing a modified encryption key in a database along with the analysis ID and encrypted data storage location information, and storing the encrypted data in a storage;

receiving a request for delivery of the encrypted data;

transmitting the analysis ID in response to the request for delivery of the encrypted data, the on-premise system retrieving the modified encryption key and the encrypted data storage location information from the database based on the analysis ID, and retrieving the encrypted data from the storage based on the storage location information;

receiving the encrypted data and the modified encryption key from the on-premise system;

restoring the original encryption key by reversing the bitwise operation previously applied to the encryption key; and decrypting the encrypted data using the restored encryption key and a predetermined decryption algorithm.

12. The method of claim 11, further comprising providing the decrypted data to the user via the cloud system.

* * * * *